Nov. 29, 1960
H. C. HADLEY
2,961,818
CORN HARVESTER
Filed Aug. 28, 1959
2 Sheets-Sheet 1
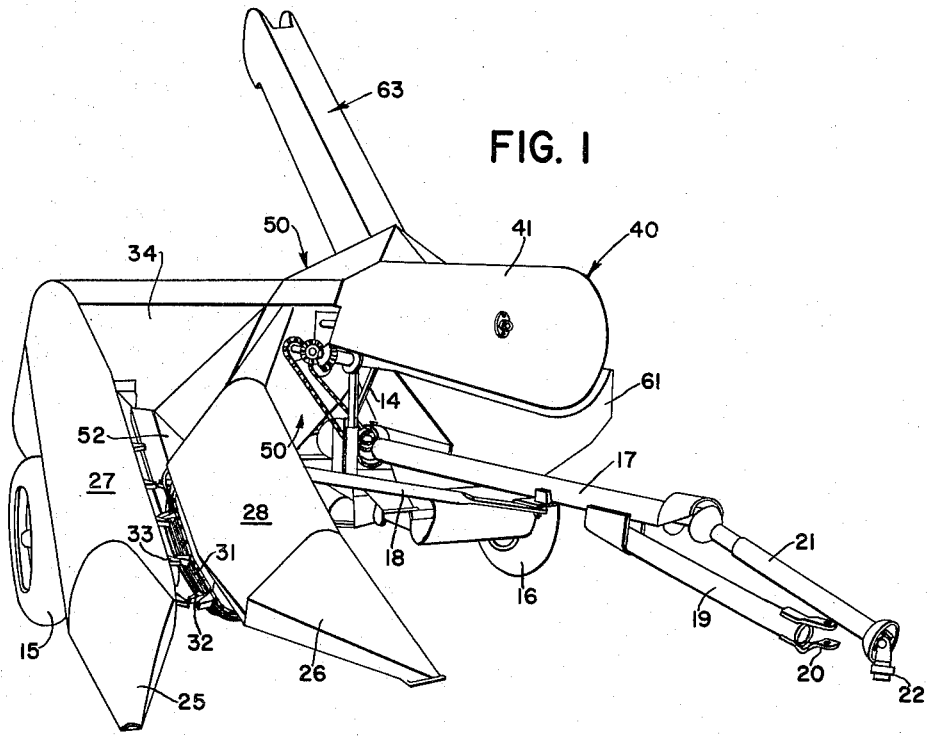
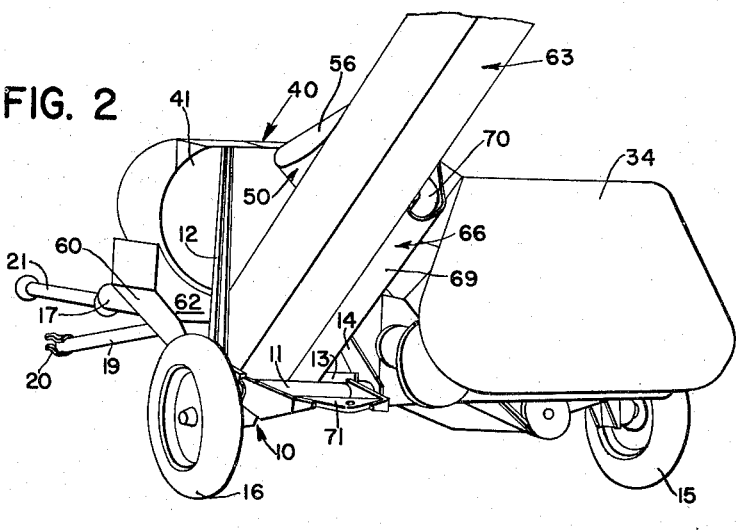
INVENTOR.
HOWARD C. HADLEY
BY
ATTORNEYS Nov. 29, 1960   H. C. HADLEY   2,961,818
CORN HARVESTER Filed Aug. 28, 1959   2 Sheets-Sheet 2

INVENTOR.
HOWARD C. HADLEY

BY
ATTORNEYS

United States Patent Office 2,961,818
Patented Nov. 29, 1960

2,961,818
CORN HARVESTER

Howard C. Hadley, Des Moines, Iowa, assignor to Deere & Company, Moline, Ill., a corporation of Delaware Filed Aug. 28, 1959, Ser. No. 836,772

8 Claims. (Cl. 56—18)

This invention relates to a corn harvester of the type to be pulled from the rear of a tractor and over a field of row-planted corn.

It is the object of the present invention to provide for a novel arrangement of the various parts composing the corn harvester that will give lateral compactness, better balance, efficiency and durability. Therefore, it is proposed in the present invention to provide a corn harvester of the trail-behind type which has a transversely disposed mobile frame with the gathering unit mounted on one side of the frame and a crop treating or corn husking unit mounted on the opposite side of the frame. The husking bed of the latter unit is disposed in a transverse inclined position so as to have a relatively high inner crop receiving end and an outer crop discharge end. The husking unit is disposed spacedly forwardly of the rear or discharge end of the gathering unit thereby leaving space for a transversely disposed auger conveyor which extends from a relatively low level adjacent the discharge end of the gathering unit upwardly and transversely to a relatively high level above and rearwardly of the husking bed. The auger housing surrounding the auger opens forwardly at the upper end so that corn will be discharged forwardly onto the husking bed. By providing for the auger conveyor to be inclined and the husking unit to be inclined in an opposite direction to the conveyor, there is provided space for discharge elevators to extend rearwardly from beneath the husking unit and the transverse conveyor. It is proposed to provide a pair of parallel discharge elevators to extend from the area of the husking unit, one discharging husks and trash received from the husking unit and the other discharging ears of corn received from the husking unit.

Other objects and purposes of the present invention will become apparent to those skilled in the art as the nature of the invention is better understood from the following description and as shown in the accompanying drawings.

Fig. 1 is a front perspective view taken slightly to one side of the harvester.

Fig. 2 is a rear perspective view also taken slightly to one side of the corn harvester.

Figure 3:
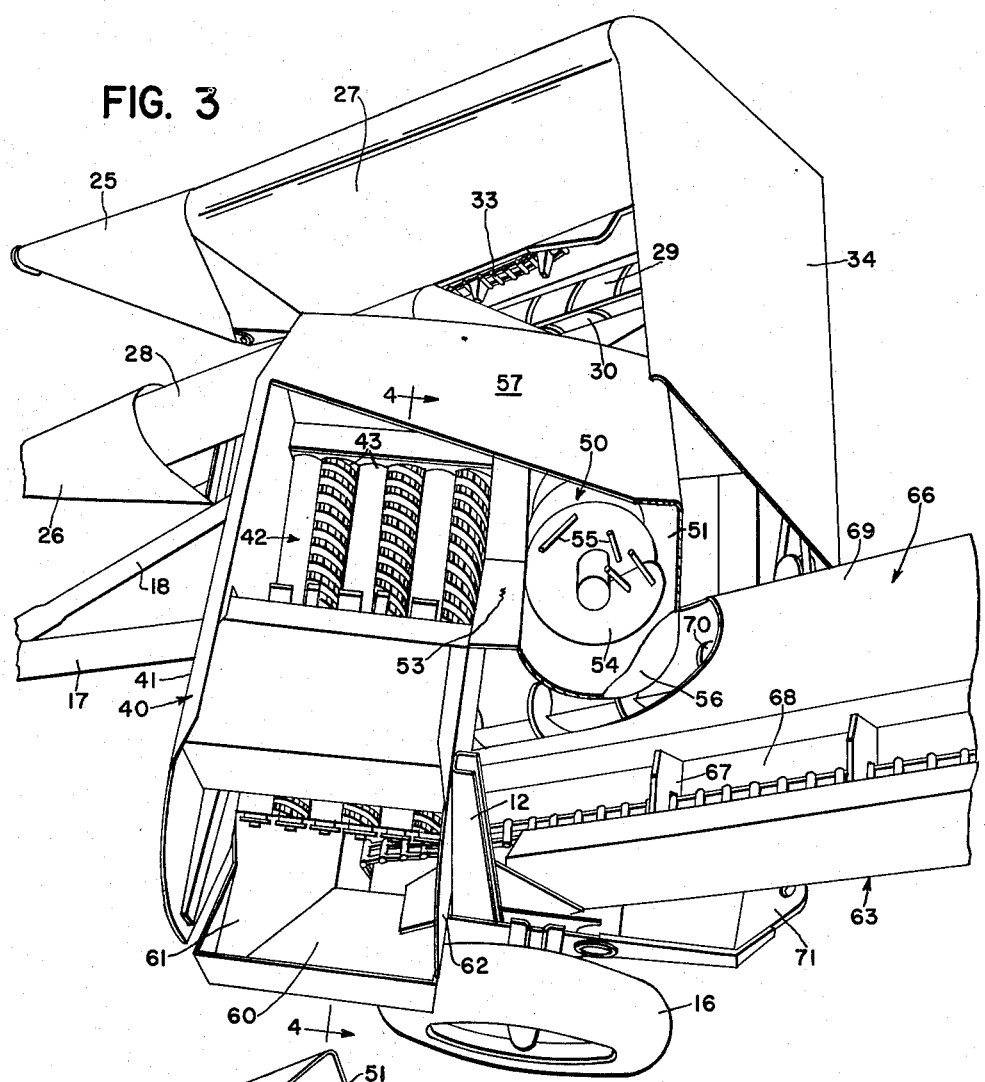
Fig. 3 is a top perspective enlarged view of the main portion of the corn harvester. Parts have been broken away for purposes of clarity.

The corn harvester is composed of a main frame 10 comprising a transverse tubular member 11 with various structural members such as 12, 13, and 14 extending radially from the axis of the tubular member to support various parts of the corn harvester. The tubular member 11 is carried on a pair of transversely spaced apart wheels 15, 16 that straddle the rows of corn. Projecting forwardly from the main frame 10 is a fore-and-aft extending tubular member 17 which forms part of the tongue or draft member. A stabilizing member 18 extends diagonally from the right side of the main frame 10 and is rigidly connected at its forward end to the tongue 17. Fixed to the forward end of the draft member 17 and extending forwardly from an underside thereof is a drawbar arm 19 with a clevis type connection 20 at its forward end which is connectible directly to the tractor. Normally in operation the harvester is balanced by means of the transverse wheels 15, 16 and the tractor drawbar which gives the harvester substantially a 3-point suspension. The forward draft member 17 is hollow and contains therein a drive shaft, not shown, which is connected to an extensible drive shaft 21 which in turn has provision at 22 for connection to the power take-off shaft on the tractor. The drive mechanism for the various elements and parts of the corn harvester are for purposes of this invention unimportant. It should be recognized that suitable drive mechanism is present and is controlled basically from the power take-off shaft of the tractor.

The harvester has a forwardly extending gathering unit carried on the right or first side of the main frame 10 which projects forwardly to receive a row of corn. The gathering unit is composed of a pair of gathering points 25, 26 which flare outwardly to opposite sides from a central stalk passage formed by sheet structure 27, 28 also on opposite sides of the passage. The gathering unit is further provided with the conventional pair of snapping rolls 29, 30 on opposite sides of the passage which operate to draw the stalks downwardly until the ears on the stalk contact the snapping rolls and are detached from the stalk. Gathering chains 33 on the right side of the stalk passage and 31, 32 on the left side of the stalk passage are provided and operate to move both the stalks and the ears upwardly to the upper rear or discharge end of the gathering unit. The rear end of the gathering unit is terminated by an upright transversely disposed paneling 34 which extends across the rear of the gathering unit and covers at its lower portion the drive mechanism for the gathering unit. The side sheeting 28 is terminated short of the rear wall or paneling 34 and forms therewith a side discharge opening for the gathering unit which permits the harvester ears to pass inwardly at the rear end of the gathering unit.

On the opposite or second side of the main frame 10 there is provided a crop treating or husking unit 40 which has suitable housing as at 41 with a husking bed 42 contained therein. The husking bed 42 is composed of a series of transversely disposed parallel pairs of husking rolls 43 which operate in conventional manner to have adjacent sides of each pair move downwardly and to draw the husks downwardly. The husking rolls 43 are inclined from a centrally located upper end which receives the crop to a relatively low crop discharge end adjacent the outer side of the main frame 10. As may be seen by viewing Fig. 3 specifically, the husking unit 40 is disposed spacedly forwardly of the rear end of the gathering unit 25.

Figure 4:
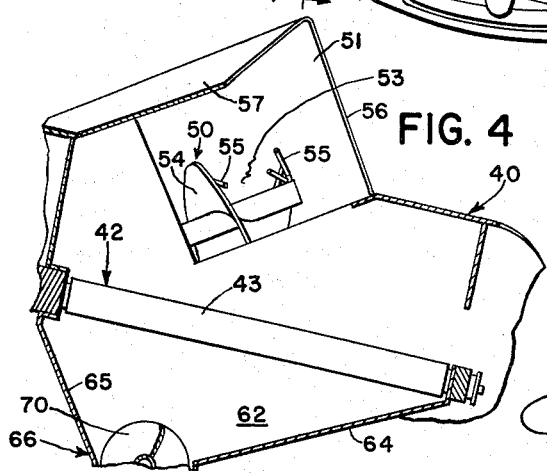
Fig. 4 is a sectional view taken substantially along the line 4—4 of Fig. 3.

Extending between the discharge end of the gathering unit 25 and the upper end of the husking unit 40 is an inclined auger type conveyor here indicated in its entirety by the reference numeral 50. The conveyor 50 is composed of an auger housing 51 having its lower intake end adjacent to the discharge portion of the gathering unit, suitable paneling as at 52 closing the lower end of the housing and providing a guide for the ears from the gathering unit into the lower end of the housing 51. The upper end of the housing 51 is closed except for a side discharge opening 53 facing forwardly above the husking bed 42. An upper end panel 56 is provided at the upper end of the housing 51 to close that end. Provided within the auger housing is an auger 54 which operates to move the ears from the gathering unit to the discharge opening 53. The auger 54 and auger housing 51 are inclined from a relatively low level to a relatively high level and, as may be seen from viewing Figs. 3 and 4, a considerable part of the husking bed 42 and auger 54 may overlap one another without losing the effectiveness of either. Positioned on the upper end of a helical flight of the auger 54 are a series of axial fingers 55 which operate to contact the ears of corn and generally throw or dispatch them onto the husking bed 42. A hood panel 57 overlies the upper end of the auger 54, the side discharge opening 53 and the husking bed 42 and further guides the ears onto the bed 42.

A hopper structure is formed under the husking unit housing 40 and includes an end panel 60 which operates in conjunction with front and rear transverse panels 61, 62 respectively to allow the corn moving off of the outer and lower end of the husking bed 42 into a rearwardly extending discharge elevator 63. Also extending fore and aft between the front and rear panels and directly beneath the husking rolls are a second pair of panels 64, 65 (Fig. 4) which direct the husks and trash passing through the husking rolls 43 downwardly and inwardly to a rearwardly inclined husk discharge elevator 66.

The lower ends of both elevators 63, 66 pass under the upper ends of the husking unit 40 and the transverse conveyor 50. Since both the husking unit 40 and elevator 50 are inclined so that their upper ends cross adjacent the central portion of the corn harvester, there is ample room beneath the upper ends to permit both elevators 63, 66 to extend underneath the respective upper ends. The corn discharge elevator 63 is of conventional type and includes therein a flight type chain driven conveyor 67 which moves the ears of corn over the floor 68 of the elevator to an upper discharge end remote of the harvester. The husk discharge elevator is of an auger type having therein an auger housing 69 surrounding an auger 70 which moves the husks through the housing 69 to a discharge end rearwardly of the harvesting unit. The auger housing 69 and the housing for the elevator 63 are rigidly united. The discharge end of the husk elevator 66 is considerably short of the discharge end of the ear discharge elevator 63 so that the trash discharging from the elevator 66 will fall short of the trailer which may be attached to the harvester main frame 10 by means of a hitch or connection 71 fixed to and extending rearwardly of the transverse tubular member 11. The ear elevator 63 has its terminal end extending above the trailer, not shown, for discharge into the trailer.

While only one form of the invention has been shown it should be recognized that other forms and variations will occur to those skilled in the art. Therefore, it should be understood that while the present disclosure was shown and described in detail for purposes of clearly and concisely illustrating the principles of the invention, it was not the intention to limit or narrow the invention beyond the broad concepts set forth in the appended claims.

What is claimed is:

1. A corn harvester adapted to be drawn over a field of row-planted crops comprising: a main frame having first and second sides spaced apart transversely to the line of travel and supported by laterally spaced apart wheels that straddle the rows of crops; a draft tongue connected to the main frame and extending forwardly and having a forward end provided with hitch means for connection to a tractor along a line of draft inwardly of said first and second sides; a gathering unit carried on the first side of the main frame and extending forwardly to gather from a crop row and having a rear discharge end; a corn husking bed carried on the second side of the main frame in laterally spaced relation to the gathering unit and forwardly of the discharge end of the gathering unit, the husking bed including a plurality of transversely disposed husking rolls inclined from upper and inner crop receiving ends to lower and outer crop discharge ends adjacent the second side of the frame; a transverse auger conveyor carried by the main frame including an auger and associated auger housing inclined from a relatively low end adjacent to and for receiving corn from the crop gathering unit to a relatively high discharge end above and to the rear of the husking bed, said auger housing further having therein a forwardly opening side discharge alongside the auger for feeding corn from the auger conveyor forwardly onto the upper end of the husking bed, the upper end of the auger housing being closed except for the side discharge; and a pair of discharge conveyors carried by the main frame positioned side by side and extending rearwardly from relatively low receiving ends beneath the husking bed to relatively high and remote discharge ends, the conveyors extending beneath the upper end of the transverse auger conveyor in their rearward projectory, the receiving end of one of the discharge conveyors opening upwardly to receive the trash from the husking bed, and the other of the discharge conveyors opening upwardly to receive the ears of corn from the husking bed.

2. A corn harvester adapted to be drawn over a field of row-planted crops comprising: a main frame having first and second sides spaced apart transversely to the line of travel and supported by laterally spaced apart wheels that straddle the rows of crops; a draft tongue connected to the main frame and extending forwardly and having a forward end provided with hitch means for connection to a tractor along a line of draft inwardly of said first and second sides; a gathering unit carried on the first side of the main frame and extending forwardly to gather from a crop row and having a rear discharge end; a corn treating unit carried on the second side of the main frame in laterally spaced relation to the gathering unit and forwardly of the discharge end of the gathering unit, the treating unit including a housing having a rearwardly facing intake opening; a transverse auger conveyor carried by the main frame including an auger and associated auger housing inclined from a relatively low end adjacent to and for receiving corn from the crop gathering unit to a relatively high discharge end to the rear of the treating unit, said auger housing further having therein a forwardly opening side discharge alongside the auger for feeding corn from the auger conveyor forwardly through the intake opening of the treating unit, the upper end of the auger housing being closed except for the side discharge; and a pair of discharge conveyors carried by the main frame positioned side by side and extending rearwardly from relatively low receiving ends beneath the treating unit to relatively high and remote discharge ends, the conveyors extending beneath the upper end of the transverse auger conveyor in their rearward projectory, the receiving end of one of the discharge conveyors opening upwardly to receive the trash from the treating unit, and the other of the discharge conveyors opening upwardly to receive the treated corn from the treating unit.

3. A corn harvester adapted to be drawn over a field of row-planted crops comprising: a main frame having first and second sides spaced apart transversely to the line of travel and supported by laterally spaced apart wheels that straddle the rows of crops; a draft tongue connected to the main frame and extending forwardly and having a forward end provided with hitch means for connection to a tractor along a line of draft inwardly of said first and second sides; a gathering unit carried on the first side of the main frame and extending forwardly to gather from a crop row and having a rear discharge end; a corn treating unit carried on the second side of the main frame in laterally spaced relation to the gathering unit and fore-and-aft spaced relation to the discharge end of the gathering unit; a transverse auger conveyor carried by the main frame including an auger and associated auger housing inclined from a relatively low end adjacent to and for receiving corn from the crop gathering unit to a relatively high discharge end above and alongside the crop treating unit, said housing further having therein a side discharge alongside the auger opening into the treating unit; and a pair of discharge conveyors carried by the main frame positioned side by side and extending rearwardly from relatively low receiving ends beneath the crop treating unit to relatively high and remote discharge ends, the conveyors extending beneath the upper end of the transverse auger conveyor in their rearward projectory, the receiving end of one of the discharge conveyors opening upwardly to receive the trash from the crop treating unit, and the other of the discharge conveyors opening upwardly to receive the treated corn from the crop treating unit.

4. The invention defined in claim 3 further characterized by the upper end of said auger adjacent the side discharge having axially extending fingers projecting from the face of the auger flight of said auger for directing the corn through the side discharge.

5. A corn harvester adapted to move over a field of row-planted crops comprising: a main frame having first and second sides spaced apart transversely to the line of travel; a gathering unit carried on the first side of the main frame and extending forwardly to gather from a crop row and having a rear discharge end; a corn husking bed carried on the second side of the main frame in laterally spaced relation to the gathering unit and forwardly of the discharge end of the gathering unit, the husking bed including a plurality of transversely disposed husking rolls inclined from upper and inner crop receiving ends to lower outer crop discharge ends; a transverse auger conveyor carried by the main frame including an auger flight and associated auger housing inclined from a relatively low end adjacent to and for receiving corn from the crop gathering unit to a relatively high discharge end above and to the rear of the husking bed, said housing further having therein a side discharge alongside the auger opening forwardly to discharge corn from the auger conveyor forwardly to the upper end of the husking bed; and axial fingers extending from the face of the auger flight adjacent the side discharge for directing corn through the discharge.

6. A corn harvester adapted to move over a field of row-planted crops comprising: a main frame having first and second sides spaced apart transversely to the line of travel; a gathering unit carried on the first side of the main frame and extending forwardly to gather from a crop row and having a rear discharge end; a corn treating unit carried on the second side of the main frame in laterally spaced relation to the gathering unit and forwardly spaced from the discharge end of the gathering unit; a transverse auger conveyor carried by the main frame including an auger flight and associated auger housing inclined from a relatively low end adjacent to and for receiving corn from the crop gathering unit to a relatively high discharge end above and to the rear of the treating unit, said housing further having therein a side discharge alongside the auger opening forwardly to discharge corn from the auger conveyor forwardly to the upper end of the treating unit; and auger fingers extending from the face of the axial flight adjacent the side discharge for directing corn through the discharge.

7. A corn harvester adapted to be drawn over a field of row-planted crops comprising: a main frame having first and second sides spaced apart transversely to the line of travel and supported by laterally spaced apart wheels that straddle the rows of crops; a draft tongue connected to the main frame and extending forwardly and having a forward end provided with hitch means for connection to a tractor along a line of draft inwardly of said first and second sides; a gathering unit carried on the first side of the main frame and extending forwardly to gather from a crop row including therein a transversely disposed upright panel and a pair of forwardly extending transversely spaced apart side sheeting forming a stalk passage, the inner of the side sheeting terminating short of the transversely disposed panel to define therewith a corn discharge; a corn husking bed carried on the second side of the main frame in laterally spaced relation to the gathering unit and spacedly forwardly of the discharge of the gathering unit, the husking bed including a plurality of transversely disposed husking rolls inclined from upper and inner crop receiving ends to lower and outer crop discharge ends; a transverse auger conveyor carried by the main frame including an auger and associated auger housing inclined from a relatively low end adjacent to and for receiving corn directly from the corn discharge of the crop gathering unit to a relatively high discharge end above and to the rear of the husking bed, said housing further having therein a side discharge alongside the auger opening forwardly to discharge corn from the auger conveyor to the upper end of the husking bed, the upper end of the housing being closed except for the side discharge; and a pair of discharge conveyors carried by the main frame positioned side by side and extending rearwardly from relatively low receiving ends beneath the husking bed to relatively high and remote discharge ends, the conveyors extending beneath the upper end of the transverse auger conveyor in their rearward projectory, the receiving end of one of the discharge conveyors opening upwardly to receive the trash from the husking bed, and the other of the discharge conveyors opening upwardly to receive the ears of corn from the husking bed.

8. A corn harvester adapted to be drawn over a field of row-planted crops comprising: a main frame having first and second sides spaced apart transversely to the line of travel and supported by laterally spaced apart wheels that straddle the rows of crops; a draft tongue connected to the main frame and extending forwardly and having a forward end provided with hitch means for connection to a tractor along a line of draft inwardly of said first and second sides; a gathering unit carried on the first side of the main frame and extending forwardly to gather from a crop row including therein a transversely disposed upright panel and a pair of forwardly extending transversely spaced apart side sheeting forming a stalk passage, the inner of the side sheeting terminating short of the transversely disposed panel to define therewith a corn discharge; a corn treating unit carried on the second side of the main frame in laterally spaced relation to the gathering unit and spacedly forwardly of the discharge of the gathering unit; a transverse auger conveyor carried by the main frame including an auger and associated auger housing inclined from a relatively low end adjacent to and for receiving corn directly from the corn discharge of the crop gathering unit to a relatively high discharge end to the rear of the treating unit, said housing further having therein a side discharge alongside the auger opening forwardly to discharge corn from the auger conveyor to the upper end of the treating unit, the upper end of the housing being closed except for the side discharge; and a pair of discharge conveyors carried by the main frame positioned side by side and extending rearwardly from relatively low receiving ends beneath the treating unit to relatively high and remote discharge ends, the conveyors extending beneath the upper end of the transverse auger conveyor in their rearward projectory, the receiving end of one of the discharge conveyors opening upwardly to receive the trash from the treating unit, and the other of the discharge conveyors opening upwardly to receive the treated corn from the treating unit.

No references cited.

UNITED STATES PATENT OFFICE
CERTIFICATION OF CORRECTION

Patent No. 2,961,818                                 November 29, 1960

Howard C. Hadley

It is hereby certified that error appears in the above numbered patent requiring correction and that the said Letters Patent should read as corrected below.

Column 4, line 43, for "unit." read -- unit, --; column 5, line 58, for "auger" read -- axial --; line 59, for "axial" read -- auger --.

Signed and sealed this 16th day of May 1961.

(SEAL)
Attest:

ERNEST W. SWIDER
Attesting Officer

DAVID L. LADD
Commissioner of Patents